(No Model.)

C. L. BEERS.
BOLT CUTTER.

No. 500,184. Patented June 27, 1893.

WITNESSES:
J. J. Laass
C. L. Bendixon

INVENTOR:
Charles L. Beers
By E. Laass
his ATTORNEYS.

UNITED STATES PATENT OFFICE.

CHARLES L. BEERS, OF SCRANTON, PENNSYLVANIA.

BOLT-CUTTER.

SPECIFICATION forming part of Letters Patent No. 500,184, dated June 27, 1893.

Application filed March 15, 1893. Serial No. 466,073. (No model.)

*To all whom it may concern:*

Be it known that I, CHARLES L. BEERS, of Scranton, in the county of Lackawanna, in the State of Pennsylvania, have invented new and useful Improvements in Bolt-Cutters, of which the following, taken in connection with the accompanying drawings, is a full, clear, and exact description.

The object of this invention is to provide a simple, convenient and efficient implement for cutting in two metal rods or bolts or analogous articles, and which shall be adapted to be used in places where the room for operating such implements is very limited, and shall possess superior power in the performance of its function. And to that end the invention consists essentially of two oppositely disposed cutting jaws pivoted to coupling straps and formed with rearwardly extending arms, two sets of toggle levers pivoted to said arms and extending in opposite directions therefrom, right and left threaded nuts pivotally connecting the sets of levers together, and a right and left screw working in said nuts as hereinafter set forth. And the invention also consists in novel auxiliary devices connected to said cutting implement, all as hereinafter more fully described and set forth in the claims.

Figure 1:
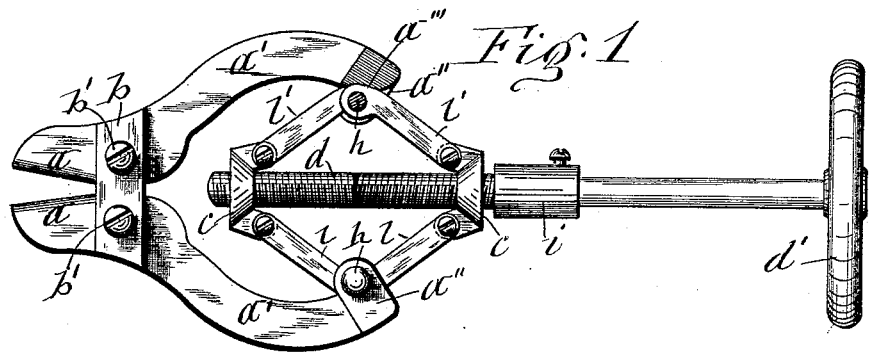
Figure 2:
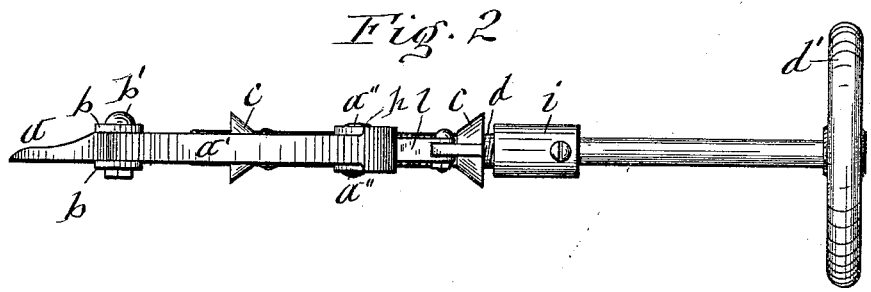
Figure 3:
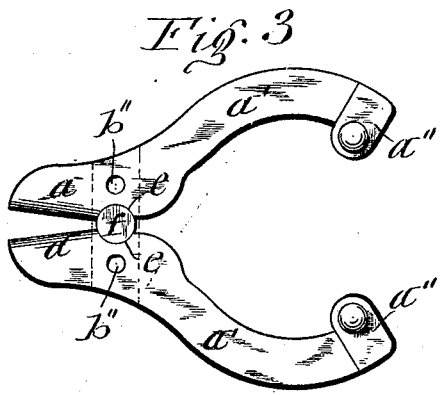

In the annexed drawings Figure 1 is a plan view of a bolt-cutter embodying my invention. Fig. 2 is an edge view of the same, and Fig. 3 is a detached plan view of the cutting jaws.

$a$—$a$— represent the cutting jaws which are disposed opposite each other and coupled together by metallic straps —$b$—$b$— on opposite sides of the heels of the jaws and pivoted thereto by bolts or rivets —$b'$—$b'$— passing through the straps and through eyes —$b''$—$b''$— in the intervening portions of the jaws. On a line with the eyes —$b''$—$b''$— of the two jaws are segmental sockets —$e$—$e$— formed in the adjacent sides of the jaws, and in said sockets is seated the bearing —$f$— on which the jaws turn and are thus pivoted to one common center which prevents either jaw from slipping longitudinally ahead of the other when the cutter is operated as hereinafter explained. The jaws are also formed with comparatively short rearwardly extending arms —$a'$—, each of which terminates with inwardly projecting ears —$a''$— between which is a segmental socket —$a'''$—.

$l$—$l$—$l'$—$l'$— represent two pairs of toggle-levers, each of which pairs has the adjacent ends of the levers inserted between the ears —$a''$— of one of the arms —$a'$— and pivoted thereto by a pin —$h$— passing through the ears and intervening ends of the levers. Said levers abutting against the socket —$a'''$— effectually relieves the pivot-pin —$h$— from shearing strain by the toggle-levers when in operation. The two pairs of levers extend in opposite directions from their respective pivots on the ears of the two arms —$a'$—$a'$— and are pivotally connected to right and left threaded nuts —$c$—$c$— in which works a right and left threaded screw —$d$— provided with a suitable handle —$d'$— by which to operate it. The described bolt-cutter is operated by turning the screw —$d$— so as to cause the two nuts —$c$—$c$— to recede from each other and by means of the toggle-levers —$l$—$l'$— draw the arms —$a'$—$a'$— toward each other and thus separate the jaws —$a$—$a$— sufficiently to receive between them the bolt to be cut. Then by turning the screw in the opposite direction the jaws are caused to approach each other and bite on the intervening bolt. In this operation the levers —$l$—$l'$— move toward a position at right angles to the axis of the screw and consequently the leverage is increased during the approach of the jaws —$a$—$a$— toward the central and largest portion of the bolt.

$i$— represents a stop on the rear end of the screw —$d$— proper to limit the movement of said screw so as to prevent it from being run completely out of the nut —$c$— adjacent to the jaws.

Having described my invention, what I claim as new, and desire to secure by Letters Patent, is—

1. The improved bolt-cutter consisting of the jaws —$a$—$a$— pivotally connected to each other and formed with arms —$a'$—$a'$—, toggle-levers —$l$—$l$— and —$l'$—$l'$— pivoted to said arms, right and left nuts —$c$—$c$— connected respectively to the ends of said levers, and the right and left screw —$d$— working in said nuts, as set forth.

2. The combination of the jaws —$a$—$a$— formed with sockets —$e$—$e$— and with arms —$a'$—$a'$—, the bearing —$f$— seated in said sockets, the straps —$b$—$b$— coupling said jaws together, the toggle-levers —$l$—$l$— and —$l'$—$l'$— pivoted to the rear ends of said levers, right and left nuts —$c$—$c$— connected respectively to the ends of said levers, and the right and left screw —$d$— working in said nuts, as set forth.

In testimony whereof I have hereunto signed my name this 6th day of March, 1893.

CHARLES L. BEERS. [L. S.]

Witnesses:
MARK W. DEWEY,
J. J. LAASS.